US012779751B2

(12) United States Patent
Takahashi et al.

(10) Patent No.: US 12,779,751 B2
(45) Date of Patent: Nov. 3, 2026

(54) INTERMEDIATE MOLD, MOLD UNIT, AND INJECTION MOLDING MACHINE

(71) Applicant: SUMITOMO HEAVY INDUSTRIES, LTD., Tokyo (JP)

(72) Inventors: Rei Takahashi, Chiba (JP); Takayuki Sato, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 125 days.

(21) Appl. No.: 18/804,500

(22) Filed: Aug. 14, 2024

(65) Prior Publication Data

US 2025/0073968 A1 Mar. 6, 2025

(30) Foreign Application Priority Data

Aug. 31, 2023 (JP) ................................ 2023-141132

(51) Int. Cl.
*B29C 45/04* (2006.01)
*B29C 45/66* (2006.01)

(52) U.S. Cl.
CPC ............ *B29C 45/045* (2013.01); *B29C 45/66* (2013.01)

(58) Field of Classification Search
None
See application file for complete search history.

(56) References Cited

FOREIGN PATENT DOCUMENTS

| | | | | |
|---|---|---|---|---|
| EP | 0070189 A1 * | 1/1983 | ........... | B29C 49/063 |
| JP | 2005335360 A * | 12/2005 | ........... | B29C 45/045 |
| JP | 4283181 B2 | 6/2009 | | |

OTHER PUBLICATIONS

Search Report issued in European Application No. 24187273.8-1014, dated Dec. 18, 2024.

* cited by examiner

*Primary Examiner* — Yung-Sheng M Tsui
(74) *Attorney, Agent, or Firm* — Michael Best & Friedrich LLP

(57) ABSTRACT

An intermediate mold disposed between a stationary-side mold and a movable-side mold in a mold unit of an injection molding machine, the intermediate mold including: a mold portion that performs a mold opening and closing operation with a facing mold facing one of the stationary-side mold and the movable-side mold; a guide bar that penetrates through the mold portion, and that guides the mold opening and closing operation; and a rotary frame body that includes a rotary shaft, and that rotates together with the guide bar and the mold portion in a state where the rotary frame body is joined to the guide bar. The mold portion is temporarily gripped by a tip part of the guide bar, and is temporarily gripped by the facing mold.

18 Claims, 5 Drawing Sheets

INTERMEDIATE MOLD, MOLD UNIT, AND INJECTION MOLDING MACHINE

CROSS-REFERENCE TO RELATED APPLICATIONS

This application claims priority to Japanese Patent Application No. 2023-141132, filed on Aug. 31, 2023, which is incorporated by reference herein in its entirety.

BACKGROUND

Technical Field

A certain embodiment of the present invention relates to an intermediate mold, a mold unit, and an injection molding machine.

Description of Related Art

As a mold unit constituting an injection molding machine, there is a mold unit in which an intermediate mold is disposed between a stationary-side mold and a movable-side mold. In addition, as the intermediate mold, there is a rotary mold that moves while rotating between a position where the rotary mold faces a stationary-side mold and a position where the rotary mold faces a movable-side mold, and that alternately performs mold opening and closing operations at the positions (for example, the related art). Such a rotary mold is controlled such that a state where the rotary mold faces one of the stationary-side mold and the movable-side mold to perform the mold opening and closing operation and a state where the rotary mold is movable while rotating between the positions are alternately repeated.

SUMMARY

According to an embodiment of the present invention, there is provided an intermediate mold disposed between a stationary-side mold and a movable-side mold in a mold unit of an injection molding machine, the intermediate mold including: a mold portion that performs a mold opening and closing operation with a facing mold facing one of the stationary-side mold and the movable-side mold; a guide bar that penetrates through the mold portion, and that guides the mold opening and closing operation; and a rotary frame body that includes a rotary shaft, and that rotates together with the guide bar and the mold portion in a state where the rotary frame body is joined to the guide bar. The mold portion is temporarily gripped by a tip part of the guide bar, and is temporarily gripped by the facing mold.

Here, the mold portion may be gripped by the tip part of the guide bar during a rotational movement in which the mold portion rotationally moves between positions where the mold portion faces the facing mold and during mold opening between the mold portion and the facing mold, and may be gripped by the facing mold during mold closing between the mold portion and the facing mold.

In addition, a first mechanism for causing the guide bar to grip the mold portion and a second mechanism for causing the facing mold to grip the mold portion may be provided at the tip part of the guide bar and the mold portion.

In addition, the first mechanism may release the mold portion when the mold portion is gripped by the facing mold, and may cause the guide bar to grip the mold portion when the mold portion is released from the facing mold.

In addition, the first mechanism may include a locking member that locks the mold portion from sliding in an axial direction of the guide bar.

In addition, the locking member may include a first locking portion that locks the mold portion from sliding toward a tip side in the axial direction of the guide bar, and a second locking portion that locks the mold portion from sliding toward a rotary frame body side in the axial direction of the guide bar.

In addition, the mold portion may include a locked member that is locked to the first locking portion during the rotational movement and the mold opening, and that is released from the first locking portion by being pressed and movable during the mold opening.

In addition, the locked member may be released from the first locking portion by being pressed against a pressing member and being movable, the pressing member being provided in the facing mold.

In addition, the second mechanism may include a movable hook portion that is pressed and movable, and a pressing member that presses the movable hook portion, and may engage the movable hook portion with a stationary hook portion fixed to the facing mold.

In addition, when the movable hook portion is movable by being pressed against the pressing member provided at the tip part of the guide bar during the mold opening, a state where the movable hook portion is engaged with the stationary hook portion may be released.

In addition, the locking member of the first mechanism may be a member that is integrally molded with the pressing member of the second mechanism.

In addition, each of the mold portion and the guide bar may be configured with a size and a shape that allow the rotational movement and the mold opening and closing operation of the mold portion.

In addition, according to another embodiment of the present invention, there is provided a mold unit of an injection molding machine, in which an intermediate mold disposed between a stationary-side mold and a movable-side mold includes a mold portion that performs a mold opening and closing operation with a facing mold facing one of the stationary-side mold and the movable-side mold, a guide bar that penetrates through the mold portion, and that guides the mold opening and closing operation, and a rotary frame body that includes a rotary shaft, and that rotates together with the guide bar and the mold portion in a state where the rotary frame body is joined to the guide bar, and the mold portion is temporarily gripped by a tip part of the guide bar, and is temporarily gripped by the facing mold.

In addition, according to still another embodiment of the present invention, there is provided an injection molding machine in which a mold unit including a stationary-side mold, a movable-side mold, and an intermediate mold disposed between the stationary-side mold and the movable-side mold is mounted. The intermediate mold includes a mold portion that performs a mold opening and closing operation with a facing mold facing one of the stationary-side mold and the movable-side mold, a guide bar that penetrates through the mold portion, and that guides the mold opening and closing operation, and a rotary frame body that includes a rotary shaft, and that rotates together with the guide bar and the mold portion in a state where the rotary frame body is joined to the guide bar. The mold portion is temporarily gripped by a tip part of the guide bar, and is temporarily gripped by the facing mold.

DETAILED DESCRIPTION

However, among states of the rotary mold, switching between the state where the rotary mold faces one of the stationary-side mold and the movable-side mold to perform the mold opening and closing operation and the state where the rotary mold is movable while rotating between the position where the rotary mold faces the stationary-side mold and the position where the rotary mold faces the movable-side mold cannot be performed by a mold opening and closing operation.

It is desirable to perform, among states of a rotary mold, switching between a state where the rotary mold faces one of a stationary-side mold and a movable-side mold to perform a mold opening and closing operation and a state where the rotary mold is movable while rotating between a position where the rotary mold faces the stationary-side mold and a position where the rotary mold faces the movable-side mold through a mold opening and closing operation.

Hereinafter, an embodiment of the present invention will be described in detail with reference to the accompanying drawings.

Configuration of Injection Molding Machine

Figures 1A, 1B:
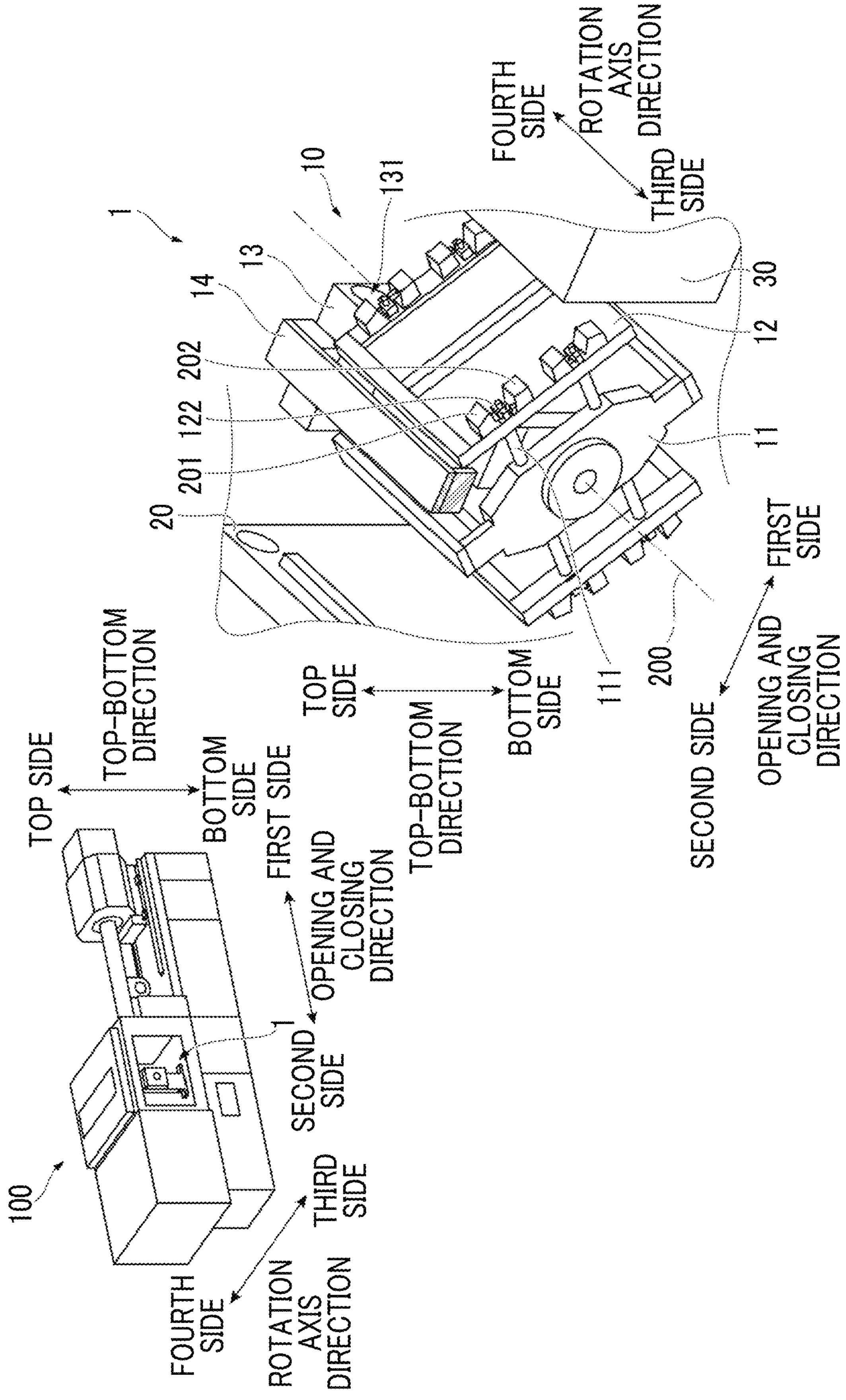
FIG. 1A is a perspective view showing one example of an external configuration of an injection molding machine according to the present embodiment.
FIG. 1B is a cross-sectional perspective view showing one example of an external configuration of a portion of a mold unit mounted in the injection molding machine of FIG. 1A.

FIG. 1A is a perspective view showing one example of an external configuration of an injection molding machine 100 according to the present embodiment. FIG. 1B is a cross-sectional perspective view showing one example of an external configuration of a portion of a mold unit 1 mounted in the injection molding machine 100 of FIG. 1A.

The injection molding machine 100 shown in FIG. 1A is a molding machine used for injection blow molding. The injection blow molding refers to a molding method in which injection molding and blow molding are performed in two stages. In the injection blow molding, first, a preform serving as a base form of a product is molded in the injection molding. Then, in the blow molding, the product is molded by blowing air into the inside of the preform and expanding the preform.

The mold unit 1 shown in FIG. 1B is mounted in the injection molding machine 100. The mold unit 1 is a mold unit that enables injection blow molding, and includes an intermediate mold 10, a stationary-side mold 30, and a movable-side mold 20. The intermediate mold 10 is a rotary mold disposed between the stationary-side mold 30 and the movable-side mold 20. The intermediate mold 10 performs a mold closing operation for closing the mold and a mold opening operation for opening the mold at a position where the intermediate mold 10 faces each of the stationary-side mold 30 and the movable-side mold 20. The mold unit 1 performs injection molding through the mold closing operation between the intermediate mold 10 and the stationary-side mold 30, and performs blow molding through the mold closing operation between the intermediate mold 10 and the movable-side mold 20.

As shown in FIG. 1B, the intermediate mold 10 includes a rotary frame body 11, a mold portion 12, a support frame 13, and a top-side member 14. The rotary frame body 11 is a metal frame body that is rotated by a rotary shaft 200. In addition, although not shown, a shaft body that is rotated by the rotary shaft 200 is attached to the rotary frame body 11. The shaft body is supported by a bearing portion of the support frame 13 in a state where the shaft body is attached to each of a third side and a fourth side of the rotary frame body 11 in a rotation axis direction or in a state where the shaft body penetrates through the rotary frame body 11. In addition, a drive unit that rotates the shaft body is connected to at least one of the third side and the fourth side of the shaft body.

A guide bar 111 that guides a mold opening and closing operation of the mold portion 12 is fixed to the rotary frame body 11. The guide bar 111 is a rod-shaped metal member that slidably penetrates through the mold portion 12. A block member 122 made of metal is joined to a tip part of the guide bar 111. In FIG. 1, the block member 122 locks the mold portion 12 from sliding on the guide bar 111. This state is a state where the mold portion 12 is gripped by the tip part of the guide bar 111.

The mold portion 12 is a plate of the mold, and two mold portions 12 are detachably attached to the rotary frame body 11 via the guide bar 111. When the rotary frame body 11 is rotated by the rotary shaft 200, the mold portion 12 rotates together with the rotary frame body 11, and moves while rotating between a position where injection molding is performed by the mold closing operation between the mold portion 12 and the stationary-side mold 30 and a position where blow molding is performed by the mold closing operation between the mold portion 12 and the movable-side mold 20.

The mold portion 12 includes a sliding mechanism 201 constituting a first mechanism for causing the tip part of the guide bar 111 to grip the mold portion 12. In addition, the mold portion 12 includes a sliding mechanism 202 constituting a second mechanism for causing a mold, which is one of the stationary-side mold 30 and the movable-side mold 20, to grip the mold portion 12, the mold facing the mold portion 12 and becoming a target for the mold opening and closing operation (hereinafter, referred to as a "facing mold"). Details of a configuration and an operation of each of the sliding mechanism 201 and the sliding mechanism 202 will be described later with reference to FIG. 2 and the subsequent figures.

The support frame 13 is a member that detachably supports each of a first side and a second side of the mold portion 12, and is fixed inside the injection molding machine 100. The support frame 13 is provided with a through-hole 131 penetrating therethrough in an opening and closing direction. The through-hole 131 is a through-hole for sliding a tie bar (not shown) that guides the mold opening and closing operation between the mold portion 12 and the stationary-side mold 30 and the mold opening and closing operation between the mold portion 12 and the movable-side mold 20. Since FIG. 1B is a cross-sectional view, only a portion of the support frame 13 which supports the second side of the mold portion 12 is shown; however, in reality, a portion that supports the first side of the mold portion 12 exists.

The top-side member 14 is a member disposed on a top side of the support frame 13 in a top-bottom direction. The top-side member 14 and the support frame 13 may be detachably connected to each other by bolts or the like, or may be joined to each other by welding or the like. In addition, a bottom-side member (not shown) for fixing the support frame 13 inside the injection molding machine 100 is disposed on a bottom side of the support frame 13.

Each of the guide bar 111 and the mold portion 12 gripped by the tip part of the guide bar 111 is configured with a size that allows the rotational operation of the mold portion 12 and the mold opening and closing operation of the mold portion 12. Namely, each of the guide bar 111 and the mold portion 12 is configured with a size and a shape in which a part (for example, end part) of the mold portion 12 and a part (for example, end part) of the facing mold do not interfere with each other when the mold portion 12 gripped by the tip part of the guide bar 111 rotationally moves.

Configuration and Operation of Cam Lock Mechanism

Figure 2:
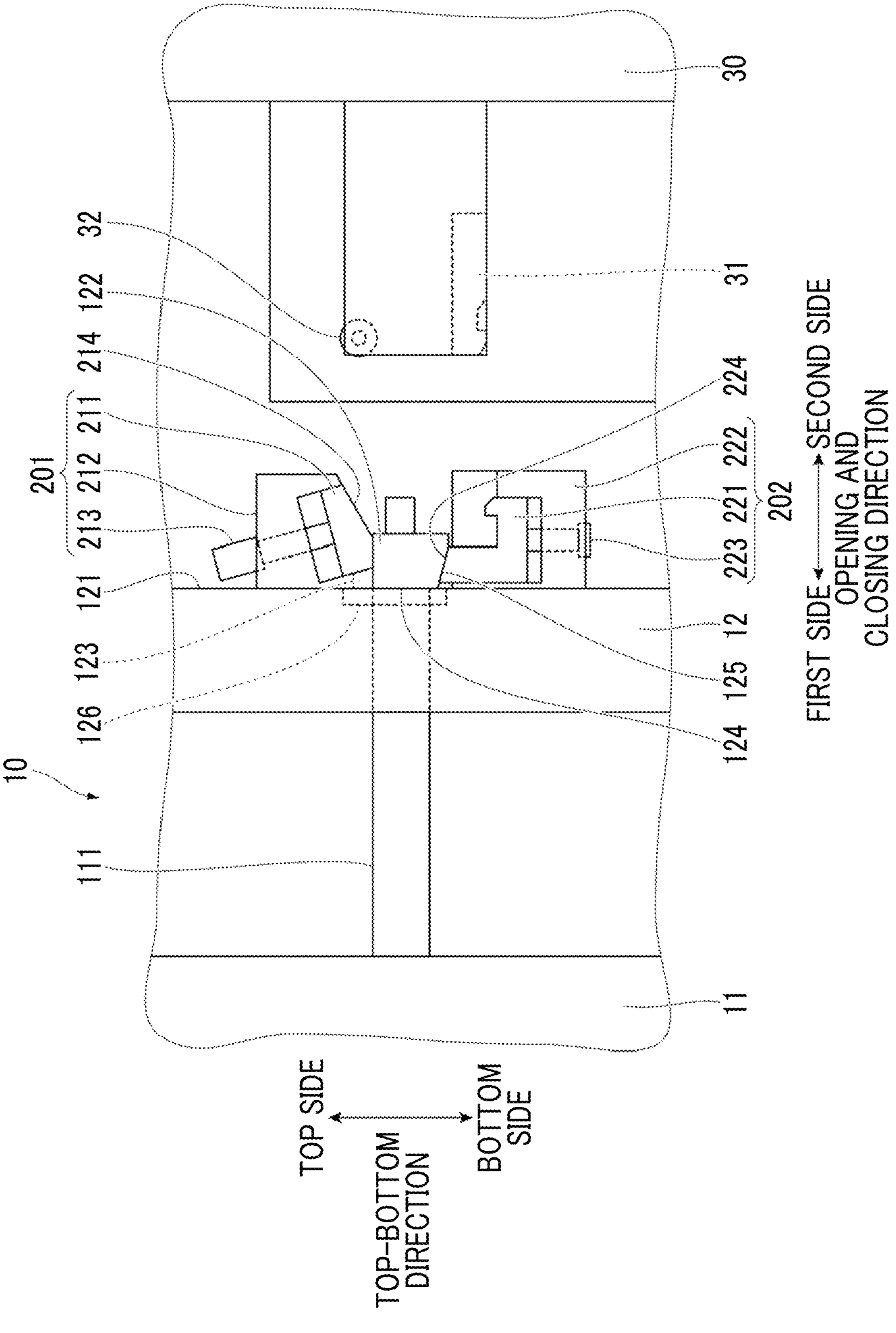
FIG. 2 is a view showing a configuration and an operation of a cam lock mechanism.
Figure 3:
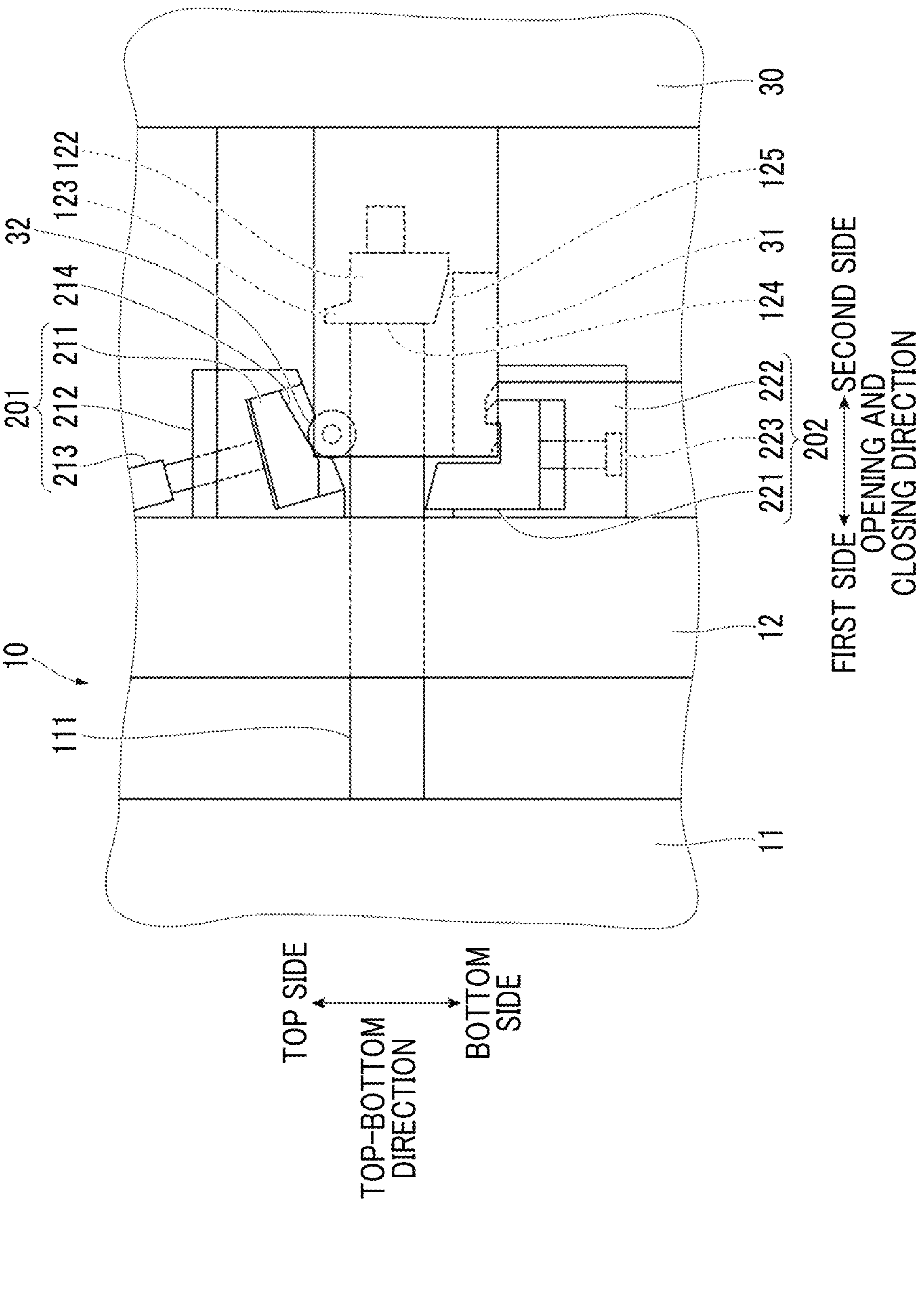
FIG. 3 is a view showing a configuration and an operation of the cam lock mechanism.
Figure 4:
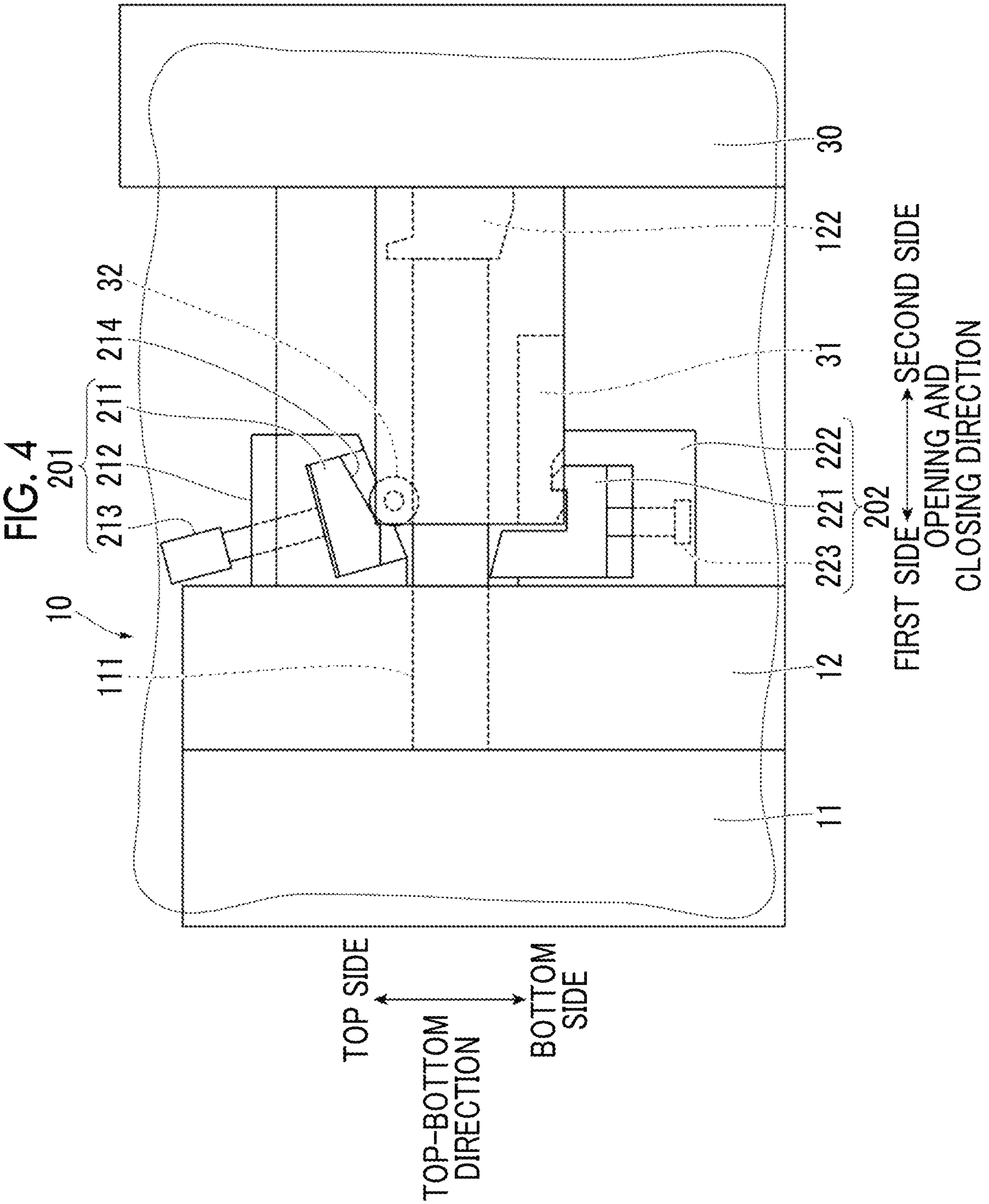
FIG. 4 is a view showing a configuration and an operation of the cam lock mechanism.

FIGS. 2 to 4 are views showing a configuration and an operation of a cam lock mechanism. FIGS. 2 to 4 show states of the mold unit 1 in FIG. 1 described above when the mold unit 1 is viewed from the third side toward the fourth side in the rotation axis direction. In the present embodiment, the "cam lock mechanism" refers to a mechanism for realizing, among the states of the mold portion 12, switching from a state where the mold portion 12 rotationally moves between a position where the mold portion 12 faces the stationary-side mold 30 and a position where the mold portion 12 faces the movable-side mold 20 (hereinafter, referred to as a "first state") to a state where the mold portion 12 faces one of the stationary-side mold 30 and the movable-side mold 20 to perform the mold opening and closing operation (hereinafter, referred to as a "second state") through one mold opening and closing operation.

Namely, in the first state, since the mold portion 12 is temporarily gripped by the tip part of the guide bar 111, and is not gripped by the facing mold, the mold portion 12 is stably rotationally movable. In addition, in the second state, since the mold portion 12 is temporarily gripped by the facing mold, and is not gripped by the tip part of the guide bar 111, the influence of an impact caused by the mold closing operation can be suppressed when the mold is closed, and the mold release order can be complied with during mold opening.

As shown in FIGS. 2 to 4, the cam lock mechanism is composed of the block member 122 joined to the tip part of the guide bar 111, the sliding mechanisms 201 and 202 provided in the mold portion 12, and a stationary hook 31 fixed to the stationary-side mold 30. The block member 122 is a member having a function of locking the mold portion 12 from sliding in an axial direction of the guide bar 111. The block member 122 includes a first locking portion 123 and a second locking portion 124.

The first locking portion 123 is a protruding portion that protrudes from an end part on the first side of the block member 122 in the opening and closing direction to the top side in the top-bottom direction, and the first locking portion 123 locks the mold portion 12 from sliding toward a rotary frame body 11 side in the axial direction of the guide bar 111 (the first side in the opening and closing direction in FIGS. 2 to 4). The second locking portion 124 is a surface formed at the end part on the first side of the block member 122 in the opening and closing direction. The second locking portion 124 locks the mold portion 12 from sliding toward a tip side in the axial direction of the guide bar 111 (the second side in the opening and closing direction in FIGS. 2 to 4). A cushioning member 126 for cushioning an impact during contact is disposed at a contact portion between the second locking portion 124 and a surface 121 on the second side of the mold portion 12. The cushioning member 126 is, for example, a foam member such as urethane.

The sliding mechanism 201 is a mechanism that constitutes a part of the first mechanism, and that causes the tip part of the guide bar 111 to grip the mold portion 12. The sliding mechanism 201 includes a locked member 211, a fixing member 212, and a spring mechanism 213. The locked member 211 is a member to be locked to the block member 122 of the guide bar 111. The fixing member 212 is a member that fixes the sliding mechanism 201 to the surface 121 on the second side of the mold portion 12 in the opening and closing direction. A space for sliding the locked member 211 is formed inside the fixing member 212. The spring mechanism 213 is a mechanism for sliding the locked member 211 toward the guide bar 111 using the elastic force of a spring, and locking the locked member 211 to the block member 122. Instead of the spring mechanism 213, a shock absorber, a gas spring, a cylinder, or the like may be used.

The sliding mechanism 202 is a mechanism that constitutes a part of the second mechanism, and that causes the stationary-side mold 30 to grip the mold portion 12. The sliding mechanism 202 includes a movable hook 221, a fixing member 222, and a spring mechanism 223. The movable hook 221 is a member that is engaged with the stationary hook 31 of the stationary-side mold 30. The fixing member 222 is a member that fixes the sliding mechanism 202 to the surface 121 on the second side of the mold portion 12. A space for sliding the movable hook 221 is formed inside the fixing member 222. The spring mechanism 223 is a mechanism for sliding the movable hook 221 toward the guide bar 111 using the elastic force of a spring, and causing the movable hook 221 to engage with the stationary hook 31 of the stationary-side mold 30. Instead of the spring mechanism 223, a shock absorber, a gas spring, a cylinder, or the like may be used.

The state of the mold portion 12 shown in FIG. 2 is the first state. As shown in FIG. 2, when the mold portion 12 is in the first state, the first locking portion 123 of the block member 122 of the guide bar 111 locks the locked member 211 of the sliding mechanism 201 of the mold portion 12, and the second locking portion 124 of the block member 122 locks the surface 121 on the second side of the mold portion 12. In addition, a pressing portion 125 forming a surface on the bottom side of the block member 122 in the top-bottom direction presses a pressed portion 224 to the bottom side to push down the movable hook 221, the pressed portion 224 forming a surface on the top side of the movable hook 221 of the sliding mechanism 202 of the mold portion 12 in the top-bottom direction.

In the first state of the mold portion 12, an inclination angle of a surface on the second side of the first locking portion 123 of the block member 122 in the opening and closing direction is the same or substantially the same as an inclination angle of a surface on the first side of the locked member 211 of the sliding mechanism 201 in the opening and closing direction. Accordingly, since the first locking portion 123 locks the locked member 211 in surface-to-surface contact, a force is uniformly applied to the first locking portion 123. On the other hand, when the inclination angles are not the same or substantially the same, a biased force is applied to the first locking portion 123, so that a risk of poor contact, deterioration, damage, or the like increases.

Further, both the surface on the second side of the first locking portion 123 in the opening and closing direction and the surface on the first side of the locked member 211 in the opening and closing direction according to the present embodiment are inclined such that end parts on the bottom side in the top-bottom direction are located closer to the second side in the opening and closing direction than end parts on the top side. Accordingly, when the block member 122 moves toward the second side in the opening and closing direction, the surface on the second side of the first locking portion 123 in the opening and closing direction and the surface on the first side of the locked member 211 in the opening and closing direction easily slide on each other. As a result, a release operation of the locked member 211 locked by the first locking portion 123 is smoothly performed.

In addition, in the first state of the mold portion 12, an inclination angle of the second locking portion 124 of the block member 122 is the same or substantially the same as an inclination angle of the surface on the second side of the mold portion 12 in the opening and closing direction. Accordingly, since the second locking portion 124 locks the mold portion 12 in surface-to-surface contact, a force is uniformly applied to the second locking portion 124. On the other hand, when the inclination angles are not the same or substantially the same, a biased force is applied to the second locking portion 124, so that a risk of poor contact, deterioration, damage, or the like increases.

In addition, in the first state of the mold portion 12, an inclination angle of the pressing portion 125 of the block member 122 is the same or substantially the same as an inclination angle of the pressed portion 224 of the movable hook 221 of the sliding mechanism 202. Accordingly, since the pressing portion 125 presses the pressed portion 224 in surface-to-surface contact, a force is uniformly applied to the pressed portion 224. On the other hand, when the inclination angles are not the same or substantially the same, a biased force is applied to the pressed portion 224, so that a risk of poor contact or the like increases.

Further, both the pressing portion 125 of the block member 122 and the pressed portion 224 of the movable hook 221 of the sliding mechanism 202 according to the present embodiment are inclined such that end parts on the second side in the opening and closing direction are located closer to the bottom side in the top-bottom direction than end parts on the first side. Accordingly, when the block member 122 moves to the first side in the opening and closing direction, the pressing portion 125 pushes down the movable hook 221 while sliding with respect to the pressed portion 224, and the movable hook 221 engaged with the stationary hook 31 is released.

The state of the mold portion 12 shown in FIGS. 3 and 4 is the second state. At the timing that the mold closing operation between the mold portion 12 and the stationary-side mold 30 is started, namely, at the timing that the state where the block member 122 locks the mold portion 12 is released and the movable hook 221 and the stationary hook 31 are engaged with each other, the state of the mold portion 12 transitions from the first state to the second state. In the mold closing operation between the mold portion 12 and the stationary-side mold 30, the guide bar 111 is inserted into the stationary-side mold 30. Then, as shown in FIG. 3, a roller follower 32 of the stationary-side mold 30 comes into contact with the locked member 211, and pushes up the locked member 211 as it is. Specifically, the roller follower 32 including a rotary shaft in the rotation axis direction in FIG. 1 described above presses the locked member 211 in a direction in which the locked member 211 separates from the guide bar 111 (toward the top side in the top-bottom direction and the first side in the opening and closing direction in FIG. 3) while rolling on a pressed surface 214 of the locked member 211, to push up the locked member 211. Accordingly, the state where the block member 122 locks the locked member 211 is released. As a result, the mold portion 12 slides on the guide bar 111 toward the rotary frame body 11.

In the second state of the mold portion 12 shown in FIGS. 3 and 4, the pressed surface 214 of the locked member 211 of the sliding mechanism 201 is inclined such that an end part on the first side in the opening and closing direction is located closer to the top side in the top-bottom direction than an end part on the second side. Accordingly, when the roller follower 32 of the stationary-side mold 30 pushes up the locked member 211 while rolling on the pressed surface 214 of the locked member 211, the roller follower 32 easily rolls on the pressed surface 214. The roller follower 32 may be replaced with another tapered member having the same inclination angle.

In addition, when the guide bar 111 is inserted into the stationary-side mold 30, the state where the block member 122 locks the movable hook 221 is released. Then, the movable hook 221 is slid toward the guide bar 111 by the elastic force of the spring mechanism 223, and the movable hook 221 and the stationary hook 31 are engaged with each other. Thereafter, the guide bar 111 is completely inserted into the stationary-side mold 30, and the rotary frame body 11 and the mold portion 12 come into contact with each other. Accordingly, the mold closing operation between the mold portion 12 and the stationary-side mold 30 is completed, and a state shown in FIG. 4 is obtained.

When the mold closing operation between the mold portion 12 and the stationary-side mold 30 is completed, the mold opening operation is started. The mold opening operation is a returning operation from the second state shown in FIG. 4 described above to the first state shown in FIG. 2 described above. Namely, at the timing that the engagement between the movable hook 221 and the stationary hook 31 is released and the block member 122 locks the mold portion 12, the state of the mold portion 12 transitions from the second state to the first state. In the mold opening operation between the mold portion 12 and the stationary-side mold 30, the guide bar 111 is pulled out from the stationary-side mold 30.

Then, as shown in FIG. 2, the roller follower 32 of the stationary-side mold 30 and the locked member 211 are separated from each other, and the spring mechanism 213 slides the locked member 211 toward the guide bar 111. Specifically, when the roller follower 32 rolls on the pressed surface 214 of the locked member 211 and then separates therefrom, the spring mechanism 213 presses the locked member 211 in a direction in which the locked member 211 approaches the guide bar 111 (toward the bottom side in the top-bottom direction in FIG. 2) to push down the locked member 211. Accordingly, the block member 122 locks the locked member 211. As a result, the mold portion 12 is locked from sliding on the guide bar 111 toward the rotary frame body 11.

In addition, when the guide bar 111 is pulled out from the stationary-side mold 30, the pressing portion 125 of the block member 122 comes into contact with the pressed portion 224 of the movable hook 221 to press the movable hook 221. Then, the movable hook 221 slides in a direction in which the movable hook 221 separates from the guide bar 111 (toward the bottom side in the top-bottom direction in FIG. 2), the engagement between the movable hook 221 and the stationary hook 31 is released, and the movable hook 221 is released. Accordingly, the mold opening operation between the mold portion 12 and the stationary-side mold 30 is completed, and the state shown in FIG. 2 is obtained.

Figure 5:
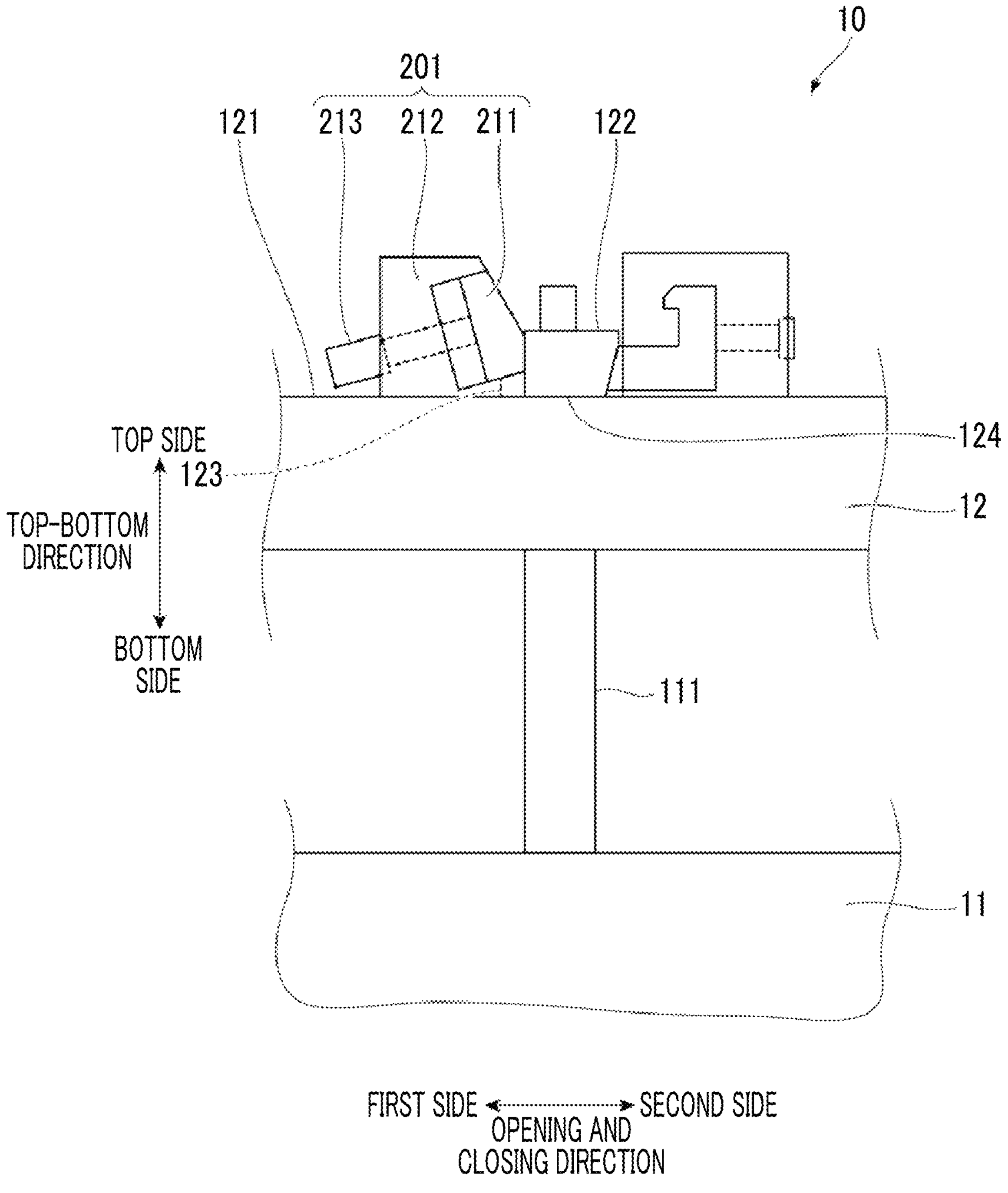
FIG. 5 is a view showing a mode when a mold portion in a first state is located on a top side in a top-bottom direction.

FIG. 5 is a view showing a mode when the mold portion 12 in the first state is located on the top side in the top-bottom direction.

As shown in FIG. 5, when the mold portion 12 is located on the top side in the top-bottom direction, a force that slides the mold portion 12 in the direction of the rotary frame body 11 along the guide bar 111 is applied to the mold portion 12. However, in a state shown in FIG. 5 as well, similarly to the state shown in FIG. 2 described above, the first locking portion 123 of the block member 122 of the guide bar 111 locks the locked member 211 of the sliding mechanism 201 of the mold portion 12. Accordingly, the mold portion 12 does not slide in the direction of the rotary frame body 11 along the guide bar 111.

In addition, when the mold portion 12 is located on the top side, due to a centrifugal force generated during rotational movement, a force that slides the mold portion 12 in a tip direction along the guide bar 111 is applied to the mold portion 12. However, in the state shown in FIG. 5 as well, similarly to the state shown in FIG. 2 described above, the second locking portion 124 of the block member 122 of the guide bar 111 locks the surface 121 on the second side of the mold portion 12. Accordingly, the mold portion 12 does not slide in the tip direction along the guide bar 111. From the above, in the state shown in FIG. 5 as well, the state where the mold portion 12 is gripped by the tip part of the guide bar 111 is maintained.

In summary, the intermediate mold, the mold unit, and the injection molding machine to which the present invention is applied may take the following configurations, and can take various embodiments.

Namely, an intermediate mold 10 according to the present embodiment is an intermediate mold disposed between a stationary-side mold 30 and a movable-side mold 20 in a mold unit 1 of an injection molding machine 100, the mold including: a mold portion 12 that performs a mold opening and closing operation with a facing mold (the stationary-side mold 30 or the movable-side mold 20) facing one of the stationary-side mold 30 and the movable-side mold 20; a guide bar 111 that penetrates through the mold portion 12, and that guides the mold opening and closing operation; and a rotary frame body 11 that includes a rotary shaft 200, and that rotates together with the guide bar 111 and the mold portion 12 in a state where the rotary frame body 11 is joined to the guide bar 111. The mold portion 12 is temporarily gripped by a tip part of the guide bar 111, and is temporarily gripped by the facing mold.

Accordingly, in the intermediate mold 10 including the mold portion 12 that performs the mold opening and closing operation with the facing mold, the guide bar 111 that guides the mold opening and closing operation in a state where the guide bar 111 penetrates through the mold portion 12, and the rotary frame body 11 that rotates together with the guide bar 111 and the mold portion 12 in a state where the rotary frame body 11 is joined to the guide bar 111, the mold portion 12 is temporarily gripped by the tip part of the guide bar 111, and is temporarily gripped by the facing mold. As a result, among states of the mold portion 12, switching between a state where the mold portion 12 is gripped by the tip part of the guide bar 111 and a state where the mold portion 12 is gripped by the facing mold can be performed by a mold opening and closing operation.

Here, the mold portion 12 may be gripped by the tip part of the guide bar 111 during a rotational movement in which the mold portion 12 rotationally moves between positions where the mold portion 12 faces the facing mold and during mold opening between the mold portion 12 and the facing mold, and may be gripped by the facing mold during mold closing between the mold portion 12 and the facing mold.

Accordingly, the mold portion 12 is gripped by the tip part of the guide bar 111 during the rotational movement in which the mold portion 12 rotationally moves between the positions where the mold portion 12 faces the facing mold and during the mold opening between the mold portion 12 and the facing mold, and is gripped by the facing mold during the mold closing between the mold portion 12 and the facing mold. As a result, among the states of the mold portion 12, switching between a first state where the mold portion 12 is rotationally movable between the positions where the mold portion 12 faces the facing mold in a state where the mold portion 12 is gripped by the tip part of the guide bar 111 and a second state where the mold portion 12 faces one of the stationary-side mold 30 and the movable-side mold 20 to perform the mold opening and closing operation can be performed by a mold opening and closing operation.

In addition, a first mechanism (the block member 122 and the sliding mechanism 201) for causing the guide bar 111 to grip the mold portion 12 and a second mechanism (the block member 122 and the sliding mechanism 202) for causing the facing mold to grip the mold portion 12 may be provided at the tip part of the guide bar 111 and the mold portion 12.

Accordingly, the first mechanism functions to cause the tip part of the guide bar 111 to grip the mold portion 12, and the second mechanism functions to cause the facing mold to grip the mold portion 12. As a result, among the states of the mold portion 12, the first state where the mold portion 12 is rotationally movable between the positions where the mold portion 12 faces the facing mold in a state where the mold portion 12 is gripped by the tip part of the guide bar 111, and the second state where the mold portion 12 faces one of the stationary-side mold 30 and the movable-side mold 20 to perform the mold opening and closing operation can be created.

In addition, the first mechanism may release the mold portion 12 when the mold portion 12 is gripped by the facing mold, and may cause the guide bar 111 to grip the mold portion 12 when the mold portion 12 is released from the facing mold.

Accordingly, since the first mechanism releases the mold portion 12 when the mold portion 12 is gripped by the facing mold, and causes the guide bar 111 to grip the mold portion 12 when the mold portion 12 is released from the facing mold, switching between the state where the mold portion 12 is gripped by the tip part of the guide bar 111 and the state where the mold portion 12 is gripped by the facing mold is smoothly performed.

In addition, the first mechanism may include a locking member (block member 122) that locks the mold portion 12 from sliding in an axial direction of the guide bar 111.

Accordingly, since the locking member of the first mechanism locks the mold portion 12 from sliding in the axial direction of the guide bar 111, the mold portion 12 can be gripped by the tip part of the guide bar 111.

In addition, the locking member may include a first locking portion 123 that locks the mold portion 12 from sliding toward a tip side in the axial direction of the guide bar 111, and a second locking portion 124 that locks the mold portion 12 from sliding toward a rotary frame body 11 side in the axial direction of the guide bar 111.

Accordingly, the first locking portion 123 of the locking member locks the mold portion 12 from sliding toward the tip side in the axial direction of the guide bar 111, and the second locking portion 124 of the locking member locks the mold portion 12 from sliding toward the rotary frame body 11 side in the axial direction of the guide bar 111. As a result, the mold portion 12 can be gripped by the tip part of the guide bar 111.

In addition, the mold portion 12 may include a locked member 211 that is locked to the first locking portion 123 during the rotational movement and the mold opening, and that is released from the first locking portion 123 by being pressed and movable during the mold opening.

Accordingly, the locked member 211 of the mold portion 12 is locked to the first locking portion 123 during the rotational movement and the mold opening, and is released from the first locking portion 123 by being pressed and movable during the mold opening. As a result, the state of the mold portion 12 in accordance with the mold opening and closing operation can be switched.

In addition, the locked member may be released from the first locking portion 123 by being pressed against a pressing member (roller follower 32) and being movable, the pressing member being provided in the facing mold.

Accordingly, the locked member is released from the first locking portion 123 by being pressed against the pressing member and being movable, the pressing member being provided in the facing mold. As a result, the mold portion 12 can be released from the guide bar 111 in accordance with a mold closing operation.

In addition, the second mechanism may include a movable hook 221 that is pressed and movable, and a pressing member (block member 122) that presses the movable hook 221, and may engage the movable hook 221 with a stationary hook 31 fixed to the facing mold.

Accordingly, the movable hook 221 is engaged with the stationary hook 31 by being pressed against the pressing member and being movable. As a result, the mold portion 12 can be gripped by the facing mold in accordance with the mold closing operation.

In addition, when the movable hook 221 is movable by being pressed against the pressing member (block member 122) provided at the tip part of the guide bar 111 during the mold opening, a state where the movable hook 221 is engaged with the stationary hook 31 may be released.

Accordingly, when the movable hook 221 is movable by being pressed against the pressing member provided at the tip part of the guide bar 111 during the mold opening, the state where the movable hook 221 is engaged with the stationary hook 31 is released. As a result, the mold portion 12 gripped by the facing mold can be released in accordance with a mold opening operation.

In addition, the locking member of the first mechanism may be a member (block member 122) that is integrally molded with the pressing member of the second mechanism.

Accordingly, since the locking member of the first mechanism and the pressing member of the second mechanism are integrally molded, the mechanism can be made compact.

In addition, each of the mold portion 12 and the guide bar 111 may be configured with a size and a shape that allow the rotational movement and the mold opening and closing operation of the mold portion 12.

Accordingly, since each of the mold portion 12 and the guide bar 111 is configured with a size and a shape that allow the rotational movement and the mold opening and closing operation of the mold portion 12, when the mold portion 12 gripped by the tip part of the guide bar 111 rotationally moves, interference such as collision between the mold portion 12 and the facing mold can be suppressed.

In addition, a mold unit 1 according to the present embodiment is a mold unit of an injection molding machine 100, in which an intermediate mold 10 disposed between a stationary-side mold 30 and a movable-side mold 20 includes a mold portion 12 that performs a mold opening and closing operation with a facing mold facing one of the stationary-side mold 30 and the movable-side mold 20, a guide bar 111 that penetrates through the mold portion 12, and that guides the mold opening and closing operation, and a rotary frame body 11 that includes a rotary shaft 200, and that rotates together with the guide bar 111 and the mold portion 12 in a state where the rotary frame body 11 is joined to the guide bar 111, and the mold portion 12 is temporarily gripped by a tip part of the guide bar 111, and is temporarily gripped by the facing mold.

Accordingly, in the mold unit 1 including the intermediate mold 10 including the mold portion 12 that performs the mold opening and closing operation with the facing mold, the guide bar 111 that guides the mold opening and closing operation in a state where the guide bar 111 penetrates through the mold portion 12, and the rotary frame body 11 that rotates together with the guide bar 111 and the mold portion 12 in a state where the rotary frame body 11 is joined to the guide bar 111, the mold portion 12 is temporarily gripped by the tip part of the guide bar 111, and is temporarily gripped by the facing mold. As a result, among states of the mold portion 12, switching between a first state where the mold portion 12 is rotationally movable between a position where the mold portion 12 faces the stationary-side mold 30 and a position where the mold portion 12 faces the movable-side mold 20 and a second state where the mold portion 12 faces one of the stationary-side mold 30 and the movable-side mold 20 to perform the mold opening and closing operation can be performed by a mold opening and closing operation.

In addition, an injection molding machine 100 according to the present embodiment is an injection molding machine in which a mold unit 1 including a stationary-side mold 30, a movable-side mold 20, and an intermediate mold 10 disposed between the stationary-side mold 30 and the movable-side mold 20 is mounted. The intermediate mold 10 includes a mold portion 12 that performs a mold opening and closing operation with a facing mold facing one of the stationary-side mold 30 and the movable-side mold 20, a guide bar 111 that penetrates through the mold portion 12, and that guides the mold opening and closing operation, and a rotary frame body 11 that includes a rotary shaft 200, and that rotates together with the guide bar 111 and the mold portion 12 in a state where the rotary frame body 11 is joined to the guide bar 111. The mold portion 12 is temporarily gripped by a tip part of the guide bar 111, and is temporarily gripped by the facing mold.

Accordingly, in the injection molding machine 100 provided with the mold unit 1 including the intermediate mold 10 including the mold portion 12 that performs the mold opening and closing operation with the facing mold, the guide bar 111 that guides the mold opening and closing operation in a state where the guide bar 111 penetrates through the mold portion 12, and the rotary frame body 11 that rotates together with the guide bar 111 and the mold portion 12 in a state where the rotary frame body 11 is joined to the guide bar 111, the mold portion 12 is temporarily gripped by the tip part of the guide bar 111, and is temporarily gripped by the facing mold. As a result, among states of the mold portion 12, switching between a first state where the mold portion 12 is rotationally movable between a position where the mold portion 12 faces the stationary-side mold 30 and a position where the mold portion 12 faces the movable-side mold 20 and a second state where the mold portion 12 faces one of the stationary-side mold 30 and the movable-side mold 20 to perform the mold opening and closing operation can be performed by a mold opening and closing operation.

It should be understood that the invention is not limited to the above-described embodiment, but may be modified into various forms on the basis of the spirit of the invention. Additionally, the modifications are included in the scope of the invention.

What is claimed is:

1. An intermediate mold configured to be disposed between a stationary-side mold and a movable-side mold in a mold unit of an injection molding machine, the intermediate mold comprising:

a mold portion configured to perform a mold opening and closing operation with a facing mold facing one of the stationary-side mold and the movable-side mold;

a guide bar configured to penetrate through the mold portion, and guide the mold opening and closing operation;

a rotary frame body that includes a rotary shaft, and configured to rotate together with the guide bar and the mold portion in a state where the rotary frame body is joined to the guide bar; and a cushioning member configured to cushion an impact generated by the mold opening and closing operation, and that is disposed in a vicinity of an edge portion of a hole through which the guide bar penetrates in the mold portion, the vicinity of the edge portion being a portion that does not affect a clamping force of the mold unit, wherein the mold portion is configured to be temporarily gripped by a tip part of the guide bar, and be temporarily gripped by the facing mold.

2. The intermediate mold according to claim 1, wherein the mold portion is gripped by the tip part of the guide bar during a rotational movement in which the mold portion rotationally moves between positions where the mold portion faces the facing mold and during mold opening between the mold portion and the facing mold, and is gripped by the facing mold during mold closing between the mold portion and the facing mold.

3. The intermediate mold according to claim 2, wherein a first mechanism for causing the guide bar to grip the mold portion and a second mechanism for causing the facing mold to grip the mold portion are provided at the tip part of the guide bar and the mold portion.

4. The intermediate mold according to claim 3, wherein the first mechanism releases the mold portion when the mold portion is gripped by the facing mold, and causes the guide bar to grip the mold portion when the mold portion is released from the facing mold.

5. The intermediate mold according to claim 4, wherein the first mechanism includes a locking member that locks the mold portion from sliding in an axial direction of the guide bar.

6. The intermediate mold according to claim 5, wherein the locking member includes a first locking portion that locks the mold portion from sliding toward a tip side in the axial direction of the guide bar, and a second locking portion that locks the mold portion from sliding toward a rotary frame body side in the axial direction of the guide bar.

7. The intermediate mold according to claim 6, wherein the mold portion includes a locked member that is locked to the first locking portion during the rotational movement and the mold opening, and that is released from the first locking portion by being pressed and movable during the mold opening.

8. The intermediate mold according to claim 7, wherein the locked member is released from the first locking portion by being pressed against a pressing member and being movable, the pressing member being provided in the facing mold.

9. The intermediate mold according to claim 8, wherein the second mechanism includes a movable hook portion that is pressed and movable, and a pressing member that presses the movable hook portion, and engages the movable hook portion with a stationary hook portion fixed to the facing mold.

10. The intermediate mold according to claim 9, wherein when the movable hook portion is movable by being pressed against the pressing member provided at the tip part of the guide bar during the mold opening, a state where the movable hook portion is engaged with the stationary hook portion is released.

11. The intermediate mold according to claim 10, wherein the locking member of the first mechanism is a member that is integrally molded with the pressing member of the second mechanism.

12. The intermediate mold according to claim 2, wherein each of the mold portion and the guide bar is configured with a size and a shape that allow the rotational movement and the mold opening and closing operation of the mold portion.

13. The intermediate mold according to claim 1, further comprising:

a support frame detachably supporting both sides of the mold portion in a mold opening and closing direction; and a top-side member disposed on a top side of the support frame in a top-bottom direction.

14. The intermediate mold according to claim 13, wherein the support frame is provided with a through-hole penetrating therethrough in the mold opening and closing direction.

15. The intermediate mold according to claim 13, wherein the support frame and the top-side member are detachably connected to each other by bolts.

16. The intermediate mold according to claim 13, wherein the support frame and the top-side member are joined to each other by welding.

17. A mold unit of an injection molding machine, wherein an intermediate mold disposed between a stationary-side mold and a movable-side mold includes a mold portion configured to perform a mold opening and closing operation with a facing mold facing one of the stationary-side mold and the movable-side mold, a guide bar configured to penetrate through the mold portion, and guide the mold opening and closing operation, a rotary frame body that includes a rotary shaft, and configured to rotate together with the guide bar and the mold portion in a state where the rotary frame body is joined to the guide bar, and a cushioning member configured to cushion an impact generated by the mold opening and closing operation, and that is disposed in a vicinity of an edge portion of a hole through which the guide bar penetrates in the mold portion, the vicinity of the edge portion being a portion that does not affect a clamping force of the mold unit, and the mold portion is configured to be temporarily gripped by a tip part of the guide bar, and be temporarily gripped by the facing mold.

18. An injection molding machine in which a mold unit including a stationary-side mold, a movable-side mold, and an intermediate mold disposed between the stationary-side mold and the movable-side mold is mounted, wherein the intermediate mold includes a mold portion configured to perform a mold opening and closing operation with a facing mold facing one of the stationary-side mold and the movable-side mold, a guide bar configured to penetrate through the mold portion, and guide the mold opening and closing operation, a rotary frame body that includes a rotary shaft, and configured to rotate together with the guide bar and the mold portion in a state where the rotary frame body is joined to the guide bar, and a cushioning member configured to cushion an impact generated by the mold opening and closing operation, and that is disposed in a vicinity of an edge portion of a hole through which the guide bar penetrates in the mold portion, the vicinity of the edge portion being a portion that does not affect a clamping force of the mold unit, and the mold portion is configured to be temporarily gripped by a tip part of the guide bar, and and be temporarily gripped by the facing mold.

* * * * *